United States Patent

Moll et al.

[15] 3,674,703
[45] July 4, 1972

[54] PREPARATION OF SILVER DISPERSIONS FOR USE IN FILTER AND ANTIHALATION LAYERS

[72] Inventors: Franz Moll, Leverkusen; Rolf-Fred Posse; Werner Ringe, both of Cologne, all of Germany

[73] Assignee: AGFA - Gevaert Aktiengesellschaft, Leverkusen, Germany

[22] Filed: March 26, 1970

[21] Appl. No.: 23,033

[30] Foreign Application Priority Data

April 5, 1969 Germany.....................P 19 17 745.8

[52] U.S. Cl..............................252/313 R, 96/84 R, 106/1, 252/300
[51] Int. Cl.......................................B01j 13/00, G03c 1/84
[58] Field of Search.....................252/313 R; 96/84 R; 106/1

[56] References Cited

UNITED STATES PATENTS 3,459,563  8/1969  Terashima et al......................96/84 X
2,688,601  9/1954  Herz......................................252/313

Primary Examiner—Richard D. Lovering
Attorney—Connolly and Hutz

[57] ABSTRACT

Silver dispersions for photographic filter and antihalation layers are produced by reduction of an aqueous silver salt solution containing a protective colloid with a compound of the oxytetronic acid series, such as ascorbic acid. Reduction is carried out in the presence of cadmium ions. This causes the silver to be precipitated in very fine grains in the dispersion so that neutral gray silver dispersions with a high covering power are obtained.

1 Claim, No Drawings

PREPARATION OF SILVER DISPERSIONS FOR USE IN FILTER AND ANTIHALATION LAYERS

The invention relates to a process for the preparation of silver dispersions for photographic antihalation or filter layers.

Silver dispersions for filter and antihalation layers have previously been prepared mainly by reduction of silver nitrate in gelatine with phenols such as hydroquinone or pyrogallol or alternatively with tannin.

These processes usually only yield blue silver dispersions which do not have a uniform absorption over the whole spectrum. Another serious disadvantage is that the oxidation products which are formed from the reducing agents have a hardening effect on gelatine.

Although the gelatine dispersions are solidified, granulated and washed after reduction, quite small quantities of oxidation products are sufficient to cause partial or complete hardening of the gelatine during prolonged storage so that it becomes unusable.

If reduction is carried out with hydrazine, black silver dispersions can be obtained, but only if silver nuclei are added to the gelatine solution. Moreover, vigorous foaming takes place due to the evolution of nitrogen. This foam formation leads to manufacturing difficulties when working on a large scale, which are difficult to overcome since the use of defoaming agents is undesirable in the production of photographic layers.

Yellow silver dispersions can be obtained by carrying out the reduction with borohydride at pH 11, boro- and aluminum hydride, aminoboranes or hydrazine. Boranes and borohydrides tend, like hydrazine, to give rise to vigorous foaming during the reduction.

It is the object of the invention to provide processes for the preparation of silver dispersions for filter and antihalation layers which yield as far as possible neutral grey silver dispersions without concomitant evolution of gas which could cause foaming.

We now have found a process for making dispersions of metallic silver by reduction of an aqueous silver salt solution with a compound of the ascorbic acid series in the presence of a protective colloid. The process according to the invention yields silver dispersions which do not have the disadvantages mentioned above. Foaming does not occur and the oxidation products of ascorbic acid do not harden the protective colloid, in particular gelatine.

Suitable compounds are preferably ascorbic acid, more particularly L-ascorbic acid or other compounds having the oxytetronic acid structure, and being capable of reducing silver salts in aqueous solution, such as D-erythro-oxytetronic acid or erythorbic acid.

The process of the invention may be modified in many ways according to the color of the silver dispersions required. The silver dispersions obtained may vary from pure yellow to blue-black depending on the pH, the nature of the protective colloid and other additives, e.g., other reducing agents, blue toners, etc. The optimum reaction conditions for any particular case can be determined by a few simple tests.

Suitable protective colloids which can be used are hydrophilic water soluble film forming substances, e.g., natural polymers such as starch or starch degradation products such as dextranes or dextrines, and proteins, particularly gelatine. Examples of suitable synthetic film forming agents are polyvinyl alcohol, partially saponified polyvinyl acetate or polyvinyl pyrrolidone. The reduction with ascorbic acid is preferably performed at a temperature of between 25° and 50° C.

The process according to the invention may be modified by replacing part of the ascorbic acid, i.e., up to 50 percent thereof, by other reducing agents. It is, of course, necessary to ensure that the advantageous effect of ascorbic acid is not lost by this substitution. Suitable reducing agents which may be used to replace ascorbic acid are for example hydrazine hydrate, hydroxylamine, compounds of the pyrrazolidone-3 series such as 1-phenyl-pyrrazolidone-3 or addition products of amines with boranes. If reducing agents which form gas are included, they should be used in such small quantities that they do not cause unwanted foam formation.

According to a preferred embodiment of the process of the invention, reduction is carried out in the presence of cadmium ions. This causes the silver to be precipitated in very fine grains in the dispersion so that neutral grey silver dispersions with a high covering power are obtained. The water soluble cadmium salt is therefore added in quantities of 1 – 10 percent by weight based on the silver nitrate. Any water soluble inorganic or organic cadmium salts are suitable, for example cadmium chloride, cadmium nitrate, cadmium sulfate or cadmium acetate.

The process according to the invention may also be varied by the addition of so-called blue toners. The usual heterocyclic compounds which have at least one mercapto group, e.g., 1-phenyl-5-mercaptotetrazole, are suitable for this purpose.

The silver dispersions are adjusted to pH 5.5 – 6.5 after reduction, solidified, granulated washed. Washing may be replaced by flocculation, e.g., with ammonium sulfate or one of the usual flocculating agents.

When the soluble salts have been washed out, the granules are melted and if desired another protective colloid is added, e.g., gelatine.

EXAMPLE 1

Fifty ml of a 7 percent (by weight) aqueous gelatine solution (salt-free bone gelatine) and the quantities given in the Table below of a 30 percent ascorbic acid solution are mixed together. Thirty-four ml of a 50 percent aqueous silver nitrate solution are added to this mixture with vigorous stirring at 30° C. The silver nitrate is reduced by this process. The colors of the silver dispersions obtained are shown in the following Table.

In parallel experiments, ascorbic acid is partly replaced by the following reducing agents.

I. 10 percent aqueous solution of hydrazine hydrate
II. 10 percent aqueous solution of hydroxylamine sulfate
III. 10 percent aqueous solution of triethylamine borane
IV. 10 percent aqueous solution of diethylamine borane
V. 20 percent aqueous solution of cadmium chloride
VI. 5 percent aqueous solution of 1-phenylpyrrazolidone-3
VII. 5 percent aqueous solution of 1-phenyl-5-mercaptotetrazole The quantities used are also given in the Table.

The pH of the solution was approximately 1.2 before addition of the silver nitrate solution.

The dispersions were solidified, noodled and washed. When the dispersions had been melted, 5 g of gelatine was added to each dispersions and the dispersion was heated at 40° C. until the gelatine had dissolved. Four ml of a 2.5 percent methanolic solution of phenol were then added as a bactericide and 2 ml of a 7.5 percent aqueous solution of saponin as wetting agent and the dispersion was applied to a support of cellulose acetate. The color was assessed in transmitted light. The experiment in which ascorbic acid is used together with cadmium chloride solution gives particularly good results. The reduced silver is in the form of extremely fine grains of neutral grey color and has a high covering power.

TABLE 1

| Ascorbic acid solution in ml | Additives in ml solution | Color |
|---|---|---|
| 64 | — | neutral grey |
| 50 | 1  I | neutral grey |
| 40 | 5  I | blue-black |
| 50 | 2  II | blue-black |
| 35 | 10 II | neutral grey |
| 30 | 1  III | neutral grey |
| 30 | 2  IV | blue grey |
| 40 | 20 V | neutral grey |

If the ascorbic acid/gelatine solution is adjusted to a pH above 4, silver dispersions of various yellow shades are obtained which are suitable for use as the so-called yellow filter layers. The silver dispersions which are obtained by the above process can be kept for a long time. Filter and antihalation layers of consistently high quality can be produced from them even after several weeks' storage. The variation with the pH is summarized in the following Table 2.

TABLE 2

| Ascorbic acid solution in ml | Additives in ml | pH during reduction | Color |
|---|---|---|---|
| 64 | 2 | VI | blue-black |
| 64 | — | 5 | brown-black |
| 64 | | 10 | yellow |
| 64 | 20 | VII | black-brown |
| 30 | 5 | I | 11 | 
| 2 | | IV | neutral-grey |
| 30 | 2 | III | 11 | yellow |
| 30 | 2 | IV | 11 | yellow |

We claim:
1. A process for the production of silver dispersions for photographic filter and antihalation layers by reducing in the presence of a protective colloid an aqueous silver salt solution with ascorbic acid in the presence of a water soluble cadmium salt in an amount of from 1 to 10 percent by weight based on the silver salt.

* * * * *

UNITED STATES PATENT OFFICE
CERTIFICATE OF CORRECTION

Patent No. 3,674,703              Dated July 4, 1972

Inventor(s)    Franz Moll et al

It is certified that error appears in the above-identified patent and that said Letters Patent are hereby corrected as shown below:

Column 2, Table 1, rewrite last three lines as follows:

| | | | |
|---|---|---|---|
| 30 | 2 | IV | blue grey |
| 40 | 20 | VI | neutral grey |
| 64 | 2 | V | blue-black |

Column 4, line 5 of the Table 2, should read as follows:

| | | | | |
|---|---|---|---|---|
| 30 | 2 | IV | 11 | neutral-grey |

Signed and sealed this 24th day of April 1973.

(SEAL)
Attest:

EDWARD M. FLETCHER, JR.          ROBERT GOTTSCHALK
Attesting Officer                  Commissioner Of Patents